(12) United States Patent
Behrends

(10) Patent No.: US 6,375,168 B2
(45) Date of Patent: Apr. 23, 2002

(54) AIR SPRING HAVING TWO END MEMBERS AND A DISTANCE SENSOR MOUNTED THEREBETWEEN

(75) Inventor: Holger Behrends, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/826,957

(22) Filed: Apr. 6, 2001

(30) Foreign Application Priority Data

Apr. 8, 2000 (DE) .......................................... 100 17 562

(51) Int. Cl.⁷ .............................. F16F 9/04; B60G 11/27
(52) U.S. Cl. ................................. 267/64.19; 267/64.27
(58) Field of Search .......................... 267/64.16, 64.19, 267/64.23, 64.24, 64.27, 113, 118; 73/629

(56) References Cited

U.S. PATENT DOCUMENTS

| | | | | |
|---|---|---|---|---|
| 4,677,263 A | * | 6/1987 | Hamilton et al. | ......... 200/61.44 |
| 5,521,497 A | * | 5/1996 | Schneider et al. | ..... 324/207.22 |
| 6,073,491 A | * | 6/2000 | Fischer et al. | ................ 73/629 |
| 6,223,500 B1 | * | 5/2001 | Fischer et al. | ................ 73/629 |

FOREIGN PATENT DOCUMENTS

DE 4413559 10/1995

* cited by examiner

*Primary Examiner*—Christopher P. Schwartz
(74) *Attorney, Agent, or Firm*—Walter Ottesen

(57) ABSTRACT

An air spring fines a longitudinal axis and includes a first end member in the form of a cover and a second end member in the form of a roll-off piston at a distance from the first end member. A flexible resilient member is clamped between the first and second end members so as to permit the first and second end members to move toward each other in the direction of the longitudinal axis and the distance between the end members changes during the operation of the air spring. An elevation sensor includes an electrically conductive helix arranged in the direction of the longitudinal axis. The helix has a plurality of turns and is arranged in the air spring so that the helix changes in length when the end members move towards each other in the direction of the longitudinal axis. The first and second end members and the flexible resilient member conjointly define an interior space. The elevation sensor further includes a length-nonchanging element mounted in the interior space on one of the end members so as to be in electrical interaction with a number of the turns. The number of the turns is dependent upon the distance between the end members.

9 Claims, 3 Drawing Sheets

AIR SPRING HAVING TWO END MEMBERS AND A DISTANCE SENSOR MOUNTED THEREBETWEEN

FIELD OF THE INVENTION

The invention relates to an air spring having two end members, namely, a cover and a roll-off piston between which a flexible member is clamped so that the end members are movable relative to each other in the longitudinal direction of the air spring The air spring further includes an electrically conductive helix aligned in the longitudinal direction of the air spring. The helix is so mounted in the air spring that it changes with respect to its length when the end members move toward each other in the longitudinal direction of the air spring.

BACKGROUND OF THE INVENTION

It has long been known to build level control systems having air springs into motor vehicles. These systems afford the advantage that the level of the vehicle can be held constant independently of its state of loading. The level control system requires elevation sensors to control the level and these sensors are assigned to the air springs. The elevation sensors can be mounted either outside of the air springs or can be integrated therein. An integration of the elevation sensors in the air springs affords the advantages that the elevation sensors are protected against mechanical loads and, furthermore, do not have to be mounted as separate components on the motor vehicle.

German patent publication 4,413,559 discloses an air spring having an integrated elevation sensor. The elevation sensor comprises an electrically conductive helix which is integrated in the flexible member of the air spring. The flexible member is clamped between the end members of the air spring and when the end members move toward each other in the longitudinal direction, the length of the electrically conductive helix changes and thereby its inductivity. A conclusion can be drawn from the magnitude of the inductivity as to the distance of the end members of the air spring from each other and therefore as to the level of the vehicle in the region of the air spring. The elevation sensor, which is disclosed in German patent publication 4,413,559, is for air springs and includes a simple configuration and a large measuring range. It has, however, been shown that the electrical helix integrated into the flexible member exhibits a small inductivity so that changes thereof can only be measured with a complex measuring arrangement.

SUMMARY OF THE INVENTION

It is an object of the invention to provide an air spring having an integrated simply configured elevation sensor which has a large measuring range. It is a further object of the invention to provide such an air spring wherein the signal of the elevation sensor can be easily evaluated.

The air spring of the invention defines a longitudinal axis and includes; a first end member in the form of a cover; a second end member in the form of a roll-off piston at a distance from the first end member; a flexible resilient member clamped between the first and second end members so as to permit the first and second end members to move toward each other in the direction of the longitudinal axis whereby the distance changes during the operation of the air spring; an elevation sensor including an electrically conductive helix arranged in the direction of the longitudinal axis; the helix having a plurality of turns and being arranged in the air spring so that the helix changes in length when the end members move towards each other in the direction of the longitudinal axis; the first and second end members and the flexible resilient member conjointly defining an interior space; the elevation sensor further including a length-nonchanging element mounted in the interior space on one of the end members so as to be in electrical interaction with a number of the turns; and, the number of the turns being dependent upon the distance between the end members.

The advantage of the invention, which is achieved therewith, is especially seen in that the elevation sensor supplies an electrical signal which is easy to evaluate while providing a simple configuration and a large length measuring range. This is so because a portion of the turns of the length-changing electrical helix enters into electrical interaction with the element not changing in length (length-nonchanging element) and, in this way, adequately large electrical signals are generated which are accessible to a simple evaluation. A further advantage of the invention is that the sensor has a low susceptibility to disturbance because the electrical measurement signals are energy rich.

According to a feature of the invention, the element is mounted in a recess disposed in one of the end faces of an end member. The advantage of this embodiment is that for an intense spring deflection of the air spring, the length-changing element cannot be damaged.

The element which does not change in length can, for example, be a core of ferromagnetic material Preferably, the element, which does not change with respect to its length, is, however, configured as an electrically conductive coil. The coil and the length-changing helix are preferably so arranged that their longitudinal axes run substantially parallel to each other. The advantage of this embodiment is that an electrical current can be driven through the coil in a controlled manner and, via the current, a magnetic field is generated in the vicinity of the coil. This magnetic field generates, in turn, a voltage in the length-changing electric-conductive helix which there leads to a current flow. The magnitude of the induced voltage, and therefore the magnitude of the current flow, is dependent upon the number of turns of the length-changing helix which are disposed in the effective region of the coil.

Basically two possibilities are present for evaluating the voltage induced in the length-changing helix. The first possibility is that an alternating current voltage having constant amplitude is applied to the coil. An alternating-current voltage is induced in the length-changing helix with an amplitude depending upon the spring deflection. This amplitude is evaluated, for example, with the aid of an envelope demodulator. A second possibility provides impressing a voltage pulse onto the coil. The voltage pulse leads to the situation that a voltage is induced in the length-changing helix, which causes a current flow in the helix. With an evaluation circuit, the time is measured which elapses until reaching a specific current threshold value in the length-changing helix. The more turns of the length-changing helix are in the active region of the coil, the higher is the induced voltage and the faster the current in the length-changing helix increases to the threshold value. From the increase time of the current, a conclusion can be drawn directly as to the distance of the end members of the air spring. Compared to the first possibility, the second possibility affords the advantage that only short-time voltage pulses are impressed on the coil so that the elevation sensor exhibits only a low current requirement.

According to another feature of the invention, the coil has a ferromagnetic core. The advantage of this embodiment is that the ferromagnetic core conducts and therefore concentrates the magnetic field, which is generated in the vicinity of the coil.

According to another embodiment of the invention, the helix and the coil each have two electrical connections which lie in the region of the cover of the air spring. The advantage of this embodiment is that the electrical connections and the evaluation electronics are arranged in the region of the suspended mass of the motor vehicle into which the air spring is built. In this way, a simple connection of the evaluation electronics to the connectors of the helix and the coil is possible. Furthermore, fewer dynamic forces act on the cover of an air spring built into a motor vehicle than on the roll-off piston so that the connectors are mechanically better protected in the region of the cover.

According to another feature of the invention, the length-changing helix is mechanically connected at one end with the cover and at the other end with the roll-off piston of the air spring. Preferably, in this case, the helix is within the air volume enclosed by the resilient member of the air spring. Use is made of this embodiment especially when the length-nonchanging element is mounted on the cover of the air spring.

According to still another embodiment of the invention, the length-changing helix is a component of the resilient member of the air spring. The advantage of this embodiment is that the helix, which is integrated into the resilient member, is well protected against mechanical loads. A further advantage of the embodiment is that no disturbing noises are caused by the helix when there is a deflection of the air spring.

According to another feature of the invention, the slope angle of the length-changing helix increases starting from the end of the helix, which is facing toward the end member on which the length-nonchanging element is mounted, in the direction of the end of the helix which is facing toward the other end member. The advantage of this embodiment is that the linearity of the elevation sensor is improved. This can be achieved, for example, in that the turn density from one end of the helix to the other end increases. Then, the compressed helix exhibits a constant slope angle over its entire length and, in contrast, the helix exhibits the above-described contour in the expanded state.

According to another embodiment of the invention, the length-changing helix and the length-nonchanging element are arranged coaxially with respect to each other. The advantage of this feature is that an interaction, which is distributed uniformly over the space, occurs between the helix and the length-nonchanging element. The length-changing helix is especially uniformly penetrated by the magnetic field which is generated by the length-nonchanging element configured as a coil and vice versa.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
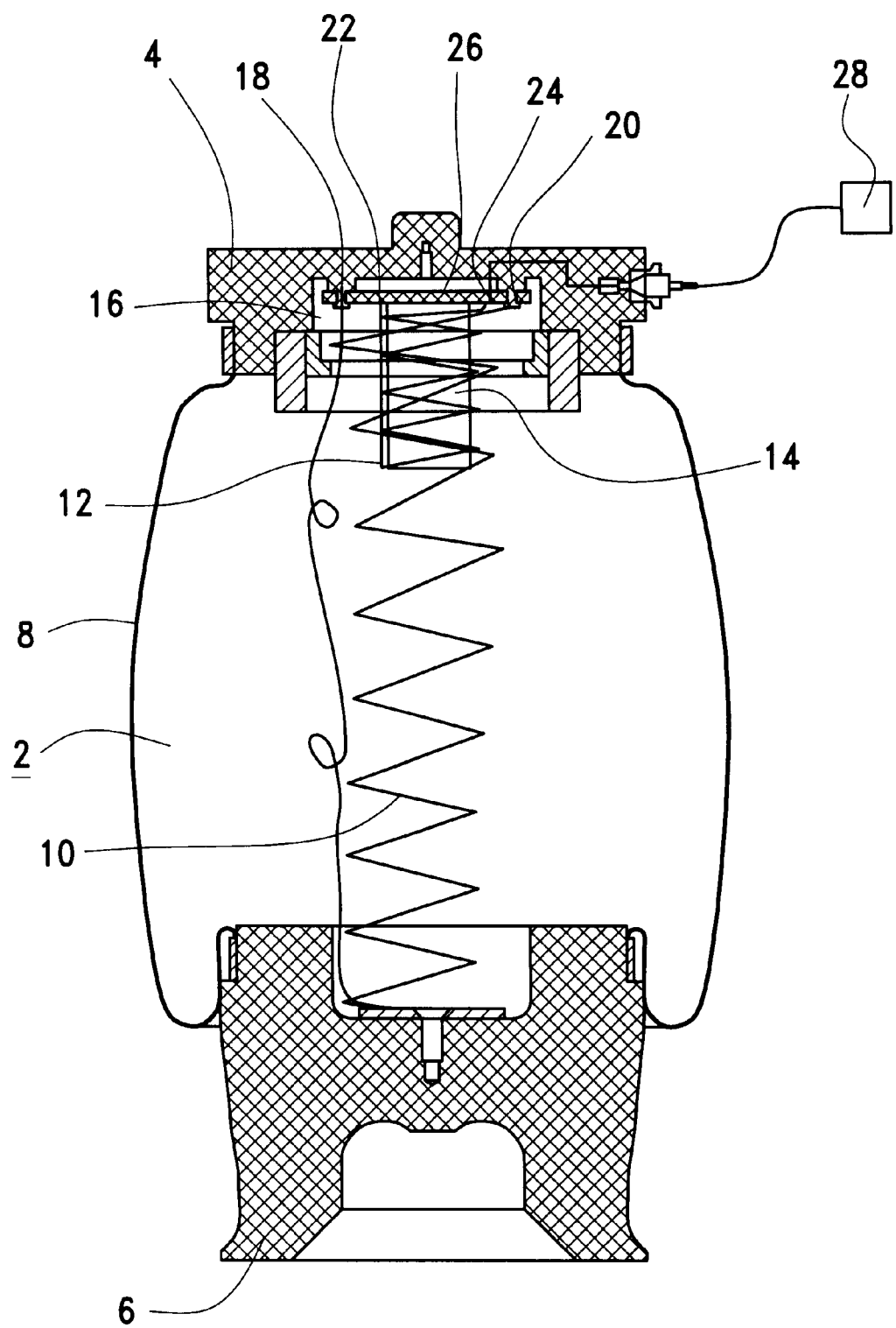
FIG. 1 is a schematic of a first embodiment of an air spring of the invention equipped with an elevation sensor.

FIG. 1 shows an air spring 2 having a cover 4 and a roll-off piston 6 between which a flexible resilient member 8 is clamped. The resilient member 8 of the air spring 2 can roll off on the roll-off piston 6 while forming a rolling lobe so that the cover 4 and the roll-off piston 6 come closer to each other and move away from each other with a movement in the opposite direction. An elevation sensor is integrated into the air spring 2 and includes a length-changing electrically conductive helix 10 and a length-nonchanging element in the form of an electrically conductive coil 12. The length-changing helix 10 lies within the space enclosed by the resilient member 8 and is attached at one end to the cover 4 and to the roll-piston 6 with the other end so that the helix is shortened when the cover 4 moves toward the roll-off piston 6 and becomes longer for movement in the opposite direction.

The coil 12 is likewise arranged within the space which is enclosed by the resilient member 8. In the embodiment shown, the coil 12 is wound on a ferromagnetic core 14 which is mounted in a recess 16 of the cover 4 in such a manner that the coil 12 is enclosed by the helix 10 and is arranged coaxially thereto. The longitudinal axes of the helix 10 and the coil 12 extend in the longitudinal direction of the air spring 2.

The electrical connectors 18 and 20 of the helix 10 and the electrical connectors 22 and 24 of the coil 12 lie on an electrically insulating plate 26 of the cover 4. Starting from the plate 26, the electrical connectors 18 to 24 of the helix 10 and coil 12 are lead to an evaluation unit 28.

With the aid of the above-described elevation sensor, the distance of the cover from the roll-off piston 6 can be determined as follows.

An alternating voltage of constant amplitude is applied to the electrical connectors 22 and 24 of the coil 12. Because of the current flow in the coil 12, a magnetic field is generated in the direct vicinity of the coil 12 having a strength which greatly reduces with increasing distance from the coil 12 and via which a voltage is induced in the helix 10. The amplitude of the induced voltage is dependent upon the number of turns of the helix 10 which are located in the active region of the magnetic field generated by the coil 12. The number of turns which are located in the active region of the magnetic field has a clear relationship to the distance of the cover 4 from the roll-off piston 6. For this reason, a conclusion can be drawn in the evaluation unit 28 from the magnitude of the induced voltage as to the distance of the cover 4 from the roll-off piston 6.

It is likewise possible to impress a voltage pulse onto the coil 12. Because of the voltage pulse, a voltage is induced in the helix 10 which leads to a current flow. The time, which is needed for reaching a current threshold value, is clearly dependent upon how many turns of the helix 10 are disposed in the active region of the magnetic field generated by the coil 12. From the required time, a conclusion can be drawn in the evaluation unit 28 as to the distance between the cover 4 and the roll-off piston 6.

Figure 2:
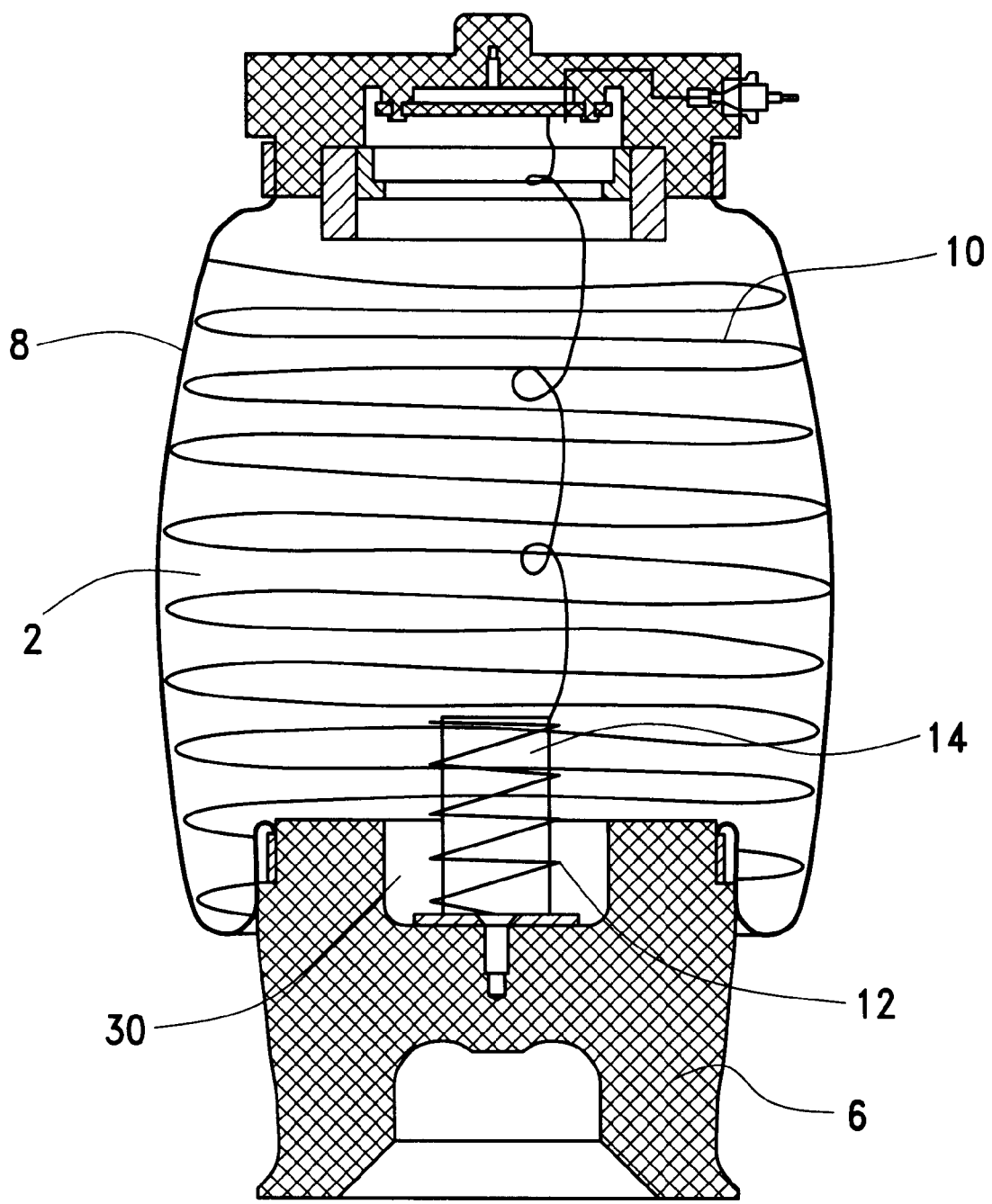
FIG. 2 is a schematic showing a second embodiment of an air spring of the invention having an elevation sensor; and, FIG. 3 is a schematic of an elevation sensor according to a feature of the invention.

FIG. 2 shows an air spring which is configured in the same manner as the air spring shown in FIG. 1 and which likewise includes an integrated elevation sensor. The elevation sensor is substantially configured in the same way as the elevation sensor shown in FIG. 1 and likewise has an electrically conductive length-changing helix 10 and an electric-conductive coil 12 which is preferably wound on a ferromagnetic core 14. A difference is that the helix 10 is a part of the resilient member 8 of the air spring 2. To achieve this, the helix can either be pressed or glued onto the surface of the resilient member facing inwardly or can be integrated directly between the layers of the resilient member. A further difference is that the coil 12 is mounted in a recess 30 of the roll-off piston 6. With respect to the operating principle of the elevation sensor, reference can be made to FIG. 1 and the description associated therewith.

Figure 3:
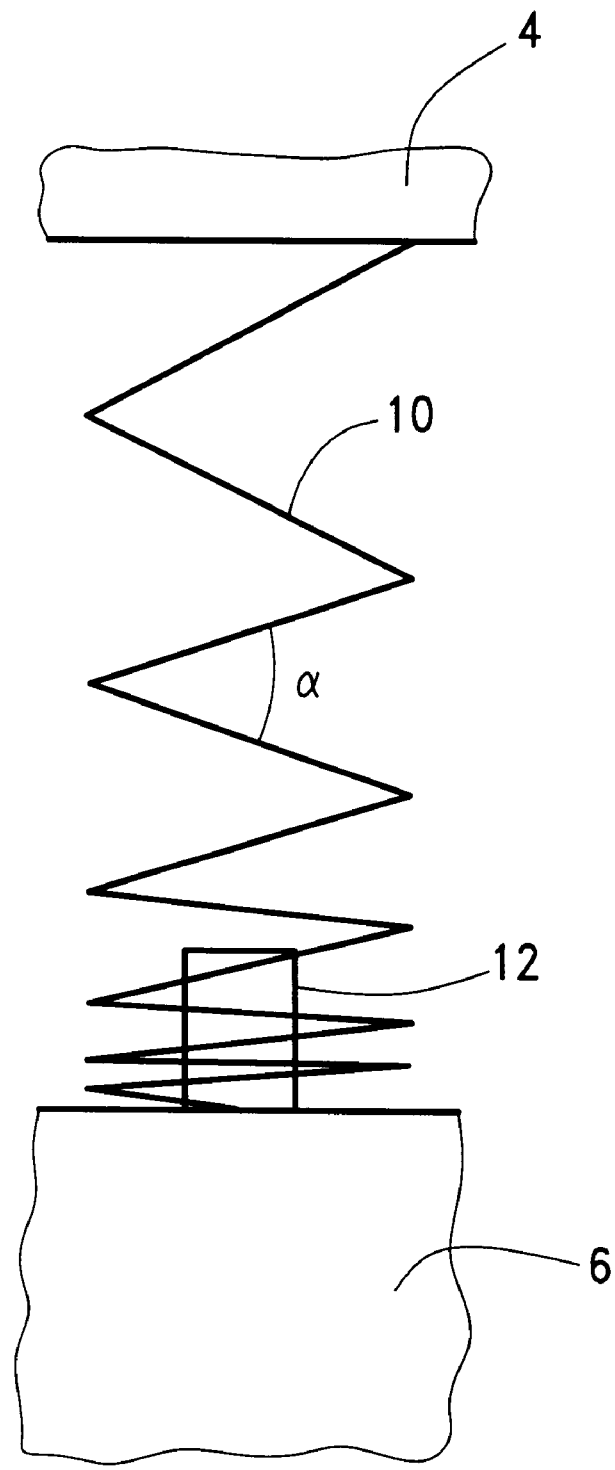

FIG. 3 shows the assignment of the length-changing helix 10 to the length-nonchanging element in the form of a coil 12. The helix 10 is attached to the cover 4 at one end and is attached to the roll-off piston 6 at the other end thereof. The coil 12 is attached to the roll-off piston 6 and is arranged coaxially to the helix 10 as also shown in FIG. 2. The slope angle α of the length-changing helix 10 increases starting from the end of the helix 10, which is assigned to the roll-off piston, in the direction of the end of the helix 10 that is assigned to the cover. This leads to a greater linearity of the elevation sensor which can be explained as follows. When the cover 4 moves toward the roll-off piston 6, an ever increasing number of turns of the helix 10 comes into the active region of the coil 12. The elevation sensor then exhibits a linear characteristic when the number of turns, which comes into the active region of the coil 12, is constant for each like length change of the helix 10. Now, those turns of the helix 10, which are farthest from the coil 12, are pushed together during the approach of the cover 4 to the roll-off piston 6 so that their slope angle a reduces continuously during this movement. For this reason, the slope angle a for the turns, which lie farther remote from the coil 12, has to be greater than the slope angle a for those turns which lie closer to the coil 12 in order to achieve a linear characteristic of the elevation sensor.

It is understood that the foregoing description is that of the preferred embodiments of the invention and that various changes and modifications may be made thereto without departing from the spirit and scope of the invention as defined in the appended claims.

What is claimed is:

1. An air spring defining a longitudinal axis and comprising:

a first end member in the form of a cover;

a second end member in the form of a roll-off piston at a distance from said first end member;

a flexible resilient member clamped between said first and second end members so as to permit said first and second end members to move toward each other in the direction of said longitudinal axis whereby said distance changes during the operation of said air spring;

an elevation sensor including an electrically conductive helix arranged in the direction of said longitudinal axis;

said helix having a plurality of turns and being arranged in said air spring so that said helix changes in length when said end members move towards each other in the direction of said longitudinal axis;

said first and second end members and said flexible resilient member conjointly defining an interior space;

said elevation sensor further including a length-nonchanging element mounted in said interior space on one of said end members so as to be in electrical interaction with a number of said turns; and, said number of said turns being dependent upon said distance between said end members.

2. The air spring of claim 1, wherein one of said end members has an end face and a recess formed in said end face; and, said length-nonchanging element is mounted in said recess.

3. The air spring of claim 2, wherein said length-nonchanging element is formed as an electrically conductive coil.

4. The air spring of claim 3, wherein said coil includes a ferromagnetic core.

5. The air spring of claim 3, wherein said helix has a first pair of electrical connections in the region of said cover; and, said coil having a second pair of electrical connections in the region of said cover.

6. The air spring of claim 1, wherein said helix has a first end mechanically connected to said cover and a second end mechanically connected to said roll-off piston.

7. The air spring of claim 1, wherein said helix is a part of said flexible resilient member of said air spring.

8. The air spring of claim 1, wherein said helix has a slope angle (α) which, starting at said one end member, increases in the direction toward the other one of said end members.

9. The air spring of claim 3, wherein said helix and said length-nonchanging element are arranged coaxially to each other.

* * * * *